United States Patent Office 2,981,659
Patented Apr. 25, 1961

2,981,659

METHOD FOR THE MICROBIOLOGICAL CONVERSION OF PREGNANE SERIES STEROIDS

Gunther S. Fonken, Kalamazoo, and Herbert C. Murray, Barry Township, Barry County, Mich., assignors to The Upjohn Company, Kalamazoo, Mich., a corporation of Delaware No Drawing. Filed May 1, 1959, Ser. No. 810,233

23 Claims. (Cl. 195—51)

This invention relates to an improvement in certain microbiological oxidations of steroids, more particularly to an improvement whereby the 20-keto function of pregnane series steroids is protected from alteration during the microbiological conversion.

According to this invention, the 20-keto function of a pregnane series steroid is protected from alteration during the microbiological oxidation of the nucleus of that steroid by employing a 20-acetal or 20-enol ether of that steroid as the starting compound in the microbiological oxidation and conducting the oxidation under substantially nonacidic conditions, thereby preventing the formation of reaction by-products resulting from the alteration of the 20-keto function. The term microbiological oxidations means microbiological oxygenations and dehydrogenations. Both types of microbiological conversions are oxidations in the electronic sense.

The discovery that certain microorganisms oxygenate, dehydrogenate or otherwise oxidize the nucleus of steroids has led to major research in this field and has resulted in many patented processes involving a wide variety of fungi, actinomycetes and bacteria. These processes have resulted in greatly simplified routes to produce natural and synthetic hormones, e.g., hydrocortisone and prednisolone.

However, as is well known in the art, these microbiological oxidations rarely produce a single product. Ordinarily a variety of products are produced, usually only one of which is useful in the particular synthesis employing the microbiological step. The production of undesirable by-products usually results in a more costly process because of the loss of steroid.

This problem has become particularly acute because of the discovery that many Δ¹,⁴ steroids are more active than the corresponding Δ⁴ compounds, as the microbiological step of introducing the Δ¹ double bond often occurs at a late stage in many synthetic routes and thus involves costly steroid intermediates. In such a situation, a 10-25% by-product production in the microbiological transformation step is a highly important factor in determining the total production cost.

This undesired by-product formation is particularly prevalent when employing microorganisms which introduce a Δ¹ double bond into 20-keto steroids. These microorganisms almost universally also attack a 20-keto pregnane so that 20-hydroxy or 17-keto steroids are exclusively produced or are included in the reaction products. The removal of the side chain renders the resulting compounds practically worthless in the anti-inflammatory field and it is well known that 20-hydroxy steroids can be converted to 20-keto steroids only in low yield in the presence of 17- or a 21-hydroxy group.

Accordingly, it is an object of this invention to provide an improved process for the nuclear microbiological oxidation of 20-keto steroids with organisms which produce by-products resulting from the alteration of the 20-keto function. Another object is the provision of a process as described above involving the use of microorganisms which introduce a Δ¹ double bond into the nucleus of the 20-keto steroid. Still another object is the provision of a process as described above employing steroids particularly valuable in the production of anti-inflammatory 20-keto steroids. A further object is the provision of certain novel steroids. Other objects will be apparent to those skilled in the art to which this invention pertains.

In carrying out the process of this invention a 20-acetal or 20-enol ether of a 20-keto steroid as described hereinafter is subjected to microbiological oxidation with an organism that bioconverts the nucleus of the corresponding 20-keto steroid and at the same time produces by-products resulting from the alteration of the 20-keto function, e.g., also produces 17-hydroxy or 17-keto steroids by side chain cleavage or 20-hydroxy steroids by reduction of the 20-keto group, the oxidation being conducted under substantially nonacidic conditions.

Many fungi, actinomycetes and bacteria have been employed to oxidize the nucleus of 20-keto steroids. Examples of the organisms include those disclosed in U.S. Patents, 2,877,162, 2,876,171, 2,876,170, 2,875,134, 2,872,381, 2,868,694, 2,865,813, 2,864,832, 2,863,806, 2,855,343, 2,854,383, 2,848,370, 2,844,513, 2,837,464, 2,835,683, 2,831,876, 2,831,798, 2,830,937, 2,830,936, 2,830,935, 2,823,171, 2,823,170, 2,822,318, 2,813,060, 2,812,286, 2,809,919, 2,802,775, 2,793,164, 2,793,163, 2,793,162, 2,789,940, 2,783,255, 2,776,927, 2,768,928, 2,765,258, 2,762,747, 2,756,179, 2,753,290, 2,735,800, 2,721,828, 2,721,163, 2,695,260, 2,658,023, 2,649,402, 2,649,401, 2,649,400 and 2,602,769. These organisms can be employed in the process of this invention and each is specifically contemplated as organisms to be employed therein. Among them are the Mucorales, Aspergillus, Streptomyces, Penicillium and many other organisms which introduce an 11-hydroxy group into the molecule. Included also in these organisms are ones which produce a change in the steroid molecule, e.g., a hydroxy group or double bond, at the 1-, 2-, 6-, 7-, 8-, 9-, 11-, 12-, 14-, 15-, 16- and 17-positions.

It is to be understood that when following the present invention, the nature and course of the oxidation employing these organisms may be altered in other ways in addition to preventing alteration of the 20-keto function, e.g., a reduction or increase in polyhydroxylation with an organism which, for example, introduces an 11-hydroxy group and a 6-hydroxy group in varying amounts. However, this invention is primarily directed to protecting the 20-keto group and side chain from degradation, oxidation or reduction. While some of these organisms produce a higher percentage of the by-products mentioned above and while conditions can be adopted which will reduce the amount of these by-products produced, the instant process is a valuable means of preventing the formation of these by-products, even though other means may be available for reducing the incidence of by-product formation by these organisms.

As mentioned previously, the organisms which introduce a Δ¹ double bond into a 20-keto steroid are particularly prone to also attack the side chain of these steroids. For this reason, this invention is particularly valuable when employing these organisms. Examples of such fungi, actinomycetes and bacteria which are known to introduce a Δ¹ double bond and which are advantageously employed in the process of this invention are fungi, e.g., of the genera Cylindrocarpon, e.g., radicicola, album, ianthothele; Fusarium, e.g., javanicum var. ensiforme, moniliforme, oxysporum, roseum and solani (also known as Hypomyces haematococcus); septomyxa, e.g., affinis; actinomycetes, e.g., Mycobacterium, especially berolinense, lacticola, thamnopheos, smegmatis and phlei; and bacteria, e.g., Bacterium, especially cyclo-oxydans; Corynebacterium, e.g. *hoagii*, Arthrobacter, e.g., *simplex*. Of these, *Septomyxa affinis* and *Corynebacterium simplex* are especially preferred. Also may be employed are the Nocardia, e.g., *aurantia*; Didymella, e.g., *lycopersici*, and Ophiobolus; *Bacillus sphaericus* and *subtilis*; Micromonospora, e.g., *chalcea*; *Streptomyces lavendulae*; Colletotrichum; Vermicularis; Calonectria, e.g., *decora*; Alternaria; Listeria; Erysipelothrix; Tricothecium; Leptosphaeria; Cucurbitaria; and Tuberculariaceae, which also introduce a $\Delta^1$ double bond.

Other organisms, which often attack the 20-keto side chain, e.g., remove the side chain or reduce the 20-keto group to a 20-hydroxy group, while at the same time performing a microbiological transformation in the nucleus, include *Penicillium lilacinum, Gliocladium catenulatum* and *deliquescens, Sporotrichum sulfurescens* and *epigaeum*; Aspergillus, e.g., *flavipes*; the Streptomyces, e.g., *fradiae; Gibberella baccata; Trichothecium roseum*; and *Proactinomyces roseus*. Thus, this invention is particularly useful when employing these organisms for the bioconversion of a 20-keto steroid.

Some species of the above-described organisms are more prone to attack side chains than others. As is also well known, fermentation conditions, e.g., rate of aeration, total time of fermentation, medium, etc., can influence the reaction products. The degree to which the side chain is attacked in a particular fermentation employing a particular organism can be determined by examination of the bioconversion products, e.g., by papergram chromatography.

Starting steroids for the process of this invention are the 20-acetals and 20-enol ethers of 20-keto steroids of the pregnane series. Included among these are the cyclic and straight-chain acetals wherein the acetal radical has the formula:

or

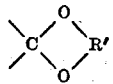

wherein R is alkyl, preferably lower alkyl containing from 1 to 8 carbon atoms, inclusive, and R' is alkylene containing from 2 to 3 carbon atoms in the chain, preferably lower alkylene containing 2 to 8 carbon atoms, e.g., ethylene, 1-methylethylene, propylene, 1-methylpropylene, 2,2-dimethylpropylene, 1-ethylethylene, 1-propylethylene, 1-butylethylene, 1-amylethylene. Also, included are the corresponding thio compounds, i.e., wherein one or both of the oxygen atoms in the above formulae are replaced by sulfur atoms. Also included are the 17(20)- or 20(21)-enol ethers, including thioenol ethers, preferably wherein the nonsteroidal portion of the ether linkage is alkyl, preferably lower alkyl as defined above. Especially preferred of the enol ethers described above are those wherein the lower-alkyl group contains from 1 to 2 carbon atoms. The preparation of 20-enol ethers and 20-acetals of 20-keto steroids is well known in the art. A more recent type of acetal which can be employed as starting compounds for this process, when the steroid contains a dihydroxyacetone side chain, is the bismethylenedioxy acetal having the formula:

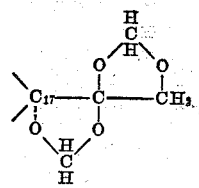

wherein the carbon atoms identified as $C_{17}$ is the $C_{17}$ carbon atom of ring D. These acetals are prepared from the corresponding dihydroxyacetone side chain steroid by reaction with formaldehyde and an acid catalyst.

Preferred among the starting steroids of this invention are the 3-keto, $\Delta^4$-3-keto, $\Delta^{1,4}$-3-keto, 3-hydroxy and $\Delta^5$-3-hydroxy steroids of the pregnane series (including the $5\alpha$ and $5\beta$ compounds) having a 20-keto group protected by an acetal or enol ether, preferably by an ethylene glycol ketal. These steroids are preferably otherwise unsubstituted in the A ring but can additionally have 6-hydroxy, -chloro, -fluoro or -methyl, 9-halo, e.g., chloro or fluoro, 11-hydroxy or keto, 12-hydroxy or keto, 16-hydroxy or methyl, 17-hydroxy or 21-hydroxy groups, a double bond, e.g., at the 6-, 8-, 8(14)-, 9(11)-, 11-, 14-, 15- or 16-position, an oxide group, e.g., at the 5(6)-, 9(11)-, 14(15)-, 16(17)-position, separately or in combination, in the molecule. The angular 18- and 19-methyl groups can be present or absent. Other free or protected keto groups, e.g., at the 3-, 6-, 7-, 12- and 15-positions, can also be present.

Especially preferred among these starting steroids for the process of this invention are 20-ethylene glycol ketals which can be represented by the formula:

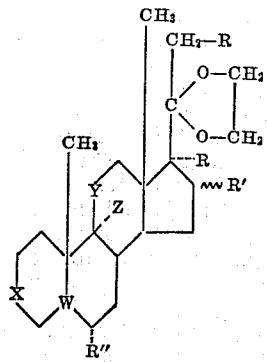

wherein R is hydrogen or hydroxy; R' is hydrogen, hydroxy or methyl; R'' is hydrogen, methyl, chlorine or fluorine; W is a single or double bonded $C_5$ carbon atom; X is CHOH or CO; Y is $CH_2$, CHOH or CO; and Z is hydrogen, and, when Y is an oxygen containing function, i.e., CHOH or CO, chlorine or fluorine.

Examples of starting steroids are the 20-ethylene ketal of each of the following: $3\alpha$- and $3\beta$-hydroxypregnan-20-one, $3\alpha$- and $3\beta$-hydroxy-5-pregnen-20-one, $3\beta$-hydroxy-$16\alpha$-methyl-5-pregnen-20-one and the corresponding $16\beta$-isomer, $3\alpha$- and $3\beta$-hydroxypregnane-11,20-dione, $3\alpha,11\alpha$-, $3\alpha,11\beta$-, $3\beta,11\alpha$- and $3\beta,11\beta$-dihydroxypregnan - 20 - one, $3\beta,5\alpha$ - dihydroxy - $6\beta$ - fluoropregnan - 20 - one, $3\beta,5\alpha$ - dihydroxy - $6\beta$ - fluoro - $16\alpha$-methylpregnan-20-one and $3\beta,5\alpha,17\alpha$-trihydroxy-$6\beta$-fluoro-$16\alpha$-methylpregnan-20-one and the corresponding $16\beta$-isomers, $3\beta$ - hydroxy - $16\alpha,17\alpha$ - epoxy - 5 - pregnen-20-one, 11-dehydroprogesterone, $9\alpha$-fluoro-, $9\alpha$-chloro- or $9\alpha$-bromo-11-ketoprogesterone, $17\alpha$-methyldehydrocorticosterone, $17\alpha$ - methyl - 11 - desoxycorticosterone, $17\alpha$-methylprogesterone, progesterone, 11-ketoprogesterone, $11\alpha$ - hydroxyprogesterone, $11\alpha$ - acetoxyprogesterone, $11\beta$ - hydroxyprogesterone, $12\alpha$ - hydroxyprogesterone, $14\alpha$ - hydroxyprogesterone, $17\alpha$ - hydroxyprogesterone, $15\beta$ - hydroxyprogesterone, 16 - hydroxyprogesterone, $14\alpha,17\alpha,21$ - trihydroxy - 4 - pregnene - 3,20 - dione, $14\alpha$, $17\alpha,21$ - trihydroxy - 4 - pregnene - 3,20 - dione, $11\alpha$, $17\alpha$ - dihydroxyprogesterone, $17\alpha$ - hydroxy - 11 - ketoprogesterone, $17\alpha,21$ - dihydroxy - 4 - pregnene - 3,20-dione, 21 - hydroxy - 4 - pregnene - 3,11,20 - trione, corticosterone, 11-desoxycorticosterone, cortisone, hydrocortisone, $9\alpha$-chloro-, bromo- or fluoro-$11\beta,17\alpha,21$-trihydroxy - 4 - pregnene - 3,20 - dione, 2 - methyl - $11\beta$, $17\alpha,21$ - trihydroxy - 4 - pregnene - 3,20 - dione, $11\alpha$, $17\alpha,21$ - trihydroxy - 4 - pregnene - 3,20 - dione, pregnane - 3,11,20 - trione, $17\alpha$ - hydroxypregnane - 3,11, 20 - trione, 17α,21 - dihydroxypregnane - 3,11,20 - trione, pregnane-3,12,20-trione, pregnane-3,20-dione, 17α-hydroxypregnane -3,20 - dione, allopregnane - 3,11,20-trione, allopregnane - 3,20 - dione, 3β,11α - dihydroxyallopregnan-20-one, 3α- and 3β-hydroxyallopregnan-20-one, 3α,12α,21 - trihydroxypregnan - 20 - one, 17α,21-hydroxy - 4 - pregnene - 9β,11β - epoxy - 3,20 - dione, 2α - methyl - 17α,21 - dihydroxy - 4,9(11) - pregnadiene-3,20 - dione, 2α - methyl - 9β,11β - epoxy - 17α,21 - dihydroxy-4-pregnene-3,20-dione, and 2α-methyl-9α-chloro-, -bromo-, and -fluoro-11β,17α,21-trihydroxy-4-pregnene-3,20-dione.

If the steroid is a mono-ketone or an 11,20-diketone, the 20-keto group can be ketalized or etherified in the usual manner, i.e., employing the selected glycol or lower alkyl orthoformate and an acid catalyst in refluxing benzene with a water trap. If it is desired, a polyketalized steroid can be employed in this process, e.g., 3,20-diketal, 3,6,20-triketal, and can be prepared from the corresponding polyketo steroid in the manner described above, employing a large excess of ketalizing agent. If it is desired to employ a 20-ketalized-20-keto steroid containing, e.g., a 3-, 6-, 7-, 12-, 14- or 15-keto group, these compounds can advantageously be prepared by ketalizing or enol etherifying the corresponding hydroxy-20-keto compound and then oxidizing the hydroxy group to a keto group under conditions which will not remove the 20-keto protecting group, e.g., an Oppenauer oxidation or an oxidation employing an N-haloamide or N-haloimide or an acid oxidizing agent under anhydrous conditions. In the progresterone or saturated-3,20-dione series, e.g., progesterone, 11α-hydroxyprogesterone, the 20-monoketal can be prepared by reacting the 3,20-diketo steroid with 2-methyl-2-ethyl dioxolane as a solvent by distillation and replacement of the solvent, in the presence of p-toluenesulfonic acid, until infrared analysis indicates that the 20-keto group has reacted to a significant extent, and then separating the mixture of 3-monoketal, 20-monoketal and 3,20-diketal thus produced and isolating the desired 20-monoketal. Similarly, about 1.5 molar equivalents of ethylene glycol or methyl orthoformate per mole of steroid, in refluxing benzene with a water take-off, can be substituted for the dioxolane. Another alternative method of preparation involves, if no 17- or 21-substituent is present, making the 3,20-dienolacetate with isopropenyl acetate and p-toluenesulfonic acid. If any hydroxy groups are present, these also will be esterified. Then the resulting compound is reduced with about 4–6 molar equivalents of sodium trimethoxyborohydride. Steric hindrance prevents the 20-ester group from being reduced. The resulting compound is then hydrolyzed with, e.g., dilute aqueous sodium hydroxide to produce the corersponding 3-hydroxy-20-keto compound which is then ketalized and the 3-hydroxy group oxidized in the manner described hereinbefore. Alternatively, the 3-keto group can be selectively reduced with sodium borohydride according to procedures known in the art.

A progesterone compound can be hydrogenated, e.g., with hydrogen and palladium on charcoal or cadmium carbonate catalyst, to the corresponding pregnane-3,20-dione compound; the 3-keto group selectively reduced with sodium borohydride to a 3-hydroxy group; the 20-keto group then ketalized or enol etherified and the 3-hydroxy group then oxidized under nonacidic conditions to produce a pregnane-3,20-dione 20-ketal or enol ether. This compound can then be oxidized with a microorganism which introduced a Δ⁴ double bond to produce the corresponding 4-pregnene-3,20-dione 20-ketal or enol ether.

As stated previously, the oxidation of the steroid is conducted at all times under substantially nonacidic conditions. Preferably, the pH is at least 7, although a short period at a pH of about 6 can be tolerated and even a very short time at a pH of about 5 does not render the process inoperable. Substantially nonacidic means at a pH of at least 7 for most, and preferably all, of the oxidation time.

The pH of the microbiological oxidation media can be controlled by techniques well known in the art. For example, the addition of phosphate ions, e.g., potassium acid phosphate, preferably in a concentration of about 0.3%, tends to buffer the medium away from the acidic side during the microbiological oxidation. Reducing the carbohydrate in the medium tends to raise the pH. With many microorganisms, the pH will rise from an acid pH to 7 or higher during the initial growth of the microorganism. For this reason, it is often advantageous to add the ketalized steroid to a beer containing, e.g., a 24–72 hour growth of the organism. Alternatively or additionally, the pH can be raised with a nontoxic base, e.g., calcium carbonate or sodium hydroxide, to achieve nonacidic conditions.

The medium necessary to achieve a satisfactory growth of the selected microorganism will, of course, depend upon the particular organism employed. The same medium can be employed as would be used in the corresponding fermentation not involving the improvement comprising this invention, if this medium does not produce an acidic beer at the time of the oxidation. Many examples of medium variants are known in the art, as exemplified in the patents noted hereinbefore. Ordinarily, submerged, aerobic fermentation conditions and a medium initially containing carbohydrate or fat and phosphate sources are employed. On a laboratory scale, a shaken flask is often employed. As stated hereinbefore, the steroid substrate is often added after a satisfactory growth of the organism in the medium has been achieved, either to achieve the proper pH conditions or to control the nature of the oxidation obtained.

The extraction and isolation techniques for obtaining the resultant oxidized steroid are well known in the art. Either the whole beer or the separated mycelium and clear beer can be extracted with, e.g., methylene chloride, benzene, or other water-immiscible solvent. The separated mycelium can also advantageously be extracted with acetone or other polar solvent.

On a small (or semimicro) scale, the oxidized steroid can be isolated and identified by chromatography on paper (the now well known papergram technique). Alternatively, the extracted steroid can be chromatogrammed on alumina or magnesium silicate or fractionally crystallized to obtain larger amounts of the desired product.

The 20-acetal or 20-enol ether group can be removed by techniques well known in the art. For example, the steroid can be dissolved in aqueous methanol or acetone containing a few drops of sulfuric or hydrochloric acid. The usual acid hydrolysis conditions are employed. However, as is well known, mild conditions, e.g., room temperature and very dilute acid, should be employed when the steroid contains acid-labile groups in addition to the 20-ketone protecting group, e.g., an 11β-hydroxy group.

The following preparations and examples are illustrative of the process and products of the present invention, but are not to be construed as limiting.

PREPARATION 1

*Pregnenolone 20-ethylene ketal*

A mixture of 10 g. of pregnenolone, 20 ml. of ethylene glycol, 0.5 g. of p-toluenesulfonic acid monohydrate and 250 ml. of benzene was refluxed with stirring for about 7 hours, using a Dean-Stark water trap. The cooled mixture was washed with aqueous sodium bicarbonate after dissolving precipitated steroid with methanol. The separated benzene layer was evaporated until only methanol remained and the resulting slurry was filtered to give 12.3 of pregnenolone 20-ethylene ketal which was recrystallized from acetone containing a trace of pyridine to give crystals melting at 167–170° C.

Following the above procedure, but substituting methyl orthoformate for the ethylene glycol, there was thus produced pregnenolone 20-methyl enol ether.

PREPARATION 2

5β-pregnane-3,11,20-trione 20-ethylene ketal 100 g. of 3α-hydroxy-5β-pregnane-11,20-dione was converted to the corresponding 20-ethylene ketal in the manner described in Preparation 1.

75.5 g. of the thus-produced 3α-hydroxy-5β-pregnane-11,20-dione 20-ethylene ketal was dissolved in 100 ml. of pyridine, diluted with 2,000 ml. of tertiary butyl alcohol and stirred overnight at room temperature with 41.3 g. of N-bromoacetamide. A solution of 25 g. of sodium sulfite in 350 ml. of water was added and the solution evaporated at reduced pressure until most of the tertiary butyl alcohol was removed. The resulting precipitate was filtered and the cake washed with aqueous sodium bicarbonate, with water and then dried. The thus-obtained 5β-pregnane-3,11,20-trione 20-ethylene ketal was recrystallized from a mixture of acetone and hexanes (Skellysolve B) to give crystals melting at 150–153° C.

Pregnenolone 20-ethylene ketal is oxidized with aluminum isopropoxide and cyclohexanone to progesterone 20-ethylene ketal.

EXAMPLE 1A

5β-pregn-1-ene-3,11,20-trione 20-ethylene ketal 10 l. of medium consisting of 1% dextrose (Cerelose) and 2% corn steep liquor of 60% solids, was adjusted to pH 4.9 with sodium hydroxide. 1 ml. of silicon oil anti-foaming agent (Dow-Corning XC-120) was added. The medium was steam sterilized at 20 lbs. pressure for 90 minutes at 120° C. Upon cooling, the sterile medium was inoculated with a 72-hour growth, from spores, of *Septomyxa affinis* (ATCC 6737). The medium was agitated, and sparged with sterile air at the rate of 0.5 l. of air per minute. After culturing at room temperature for 48 hours at 28° C., the pH was 7.5. To this 48-hour culture there was added 2.0 g. of 5β-pregnane-3,11,20-trione 20-ethylene ketal plus 50 mg. of 3-keto-bisnor-4-cholen-22-aldehyde as a conversion assistant in 30 ml. of N,N-dimethylformamide. The flask was rinsed with 10 ml. of acetone which was also added to the medium. Fermentation of the steroid was maintained for 48 hours, at the end of which time the pH was 8.15. The fermentation broth was strained through gauze to separate the mycelium. The filtrate was extracted with methylene chloride. The methylene chloride extracts were distilled under reduced pressure to a volume of about 1 l. and evaporated in air. The residual solids were chromatographed through a 2.8 x 36 cm. column of magnesium silicate (Florisil). Hexanes (Skellysolve B) plus 5% acetone eluted 5β-pregn-1-ene-3,11,20-trione 20-ethylene ketal which was recrystallized from a mixture of hexanes and acetone to give 0.87 g. of crystals melting at 204–206° C., having a $$\lambda_{max.}^{EtOH}\ 225\ m\mu;\ a_M\ 8800$$

A solution of 0.50 g. of 5β-pregn-1-ene-3,11,20-trione 20-ethylene ketal in 25 ml. of methanol was hydrolyzed by the addition of 5 ml. of N-hydrochloric acid and permitting the reaction mixture to stand at room temperature for several hours. The hydrolyzed solution was concentrated to a small volume and cooled, whereupon crystals of 5β-pregn-1-ene-3,11,20-trione formed and were separated by filtration. The compound has a melting point of 152–162° C.

5β-pregn-1-ene-3,11,20-trione possesses useful pharmacological properties, including central nervous system depressant activity, rendering the compound useful as an anesthetic, e.g., during the manipulation of and experimentation with laboratory animals including rabbits, mice and rats. Administration can be by the usual dosage forms, including pills, tablets, capsules, syrups or elixirs for oral use, or in the known liquid forms which are adaptable for injection.

EXAMPLE 1B

Following the procedure of Example 1A exactly, but substituting 5β-pregnane-3,11,20-trione as the steroid substrate, no 5β-pregn-1-ene-3,11,20-trione could be found in the ferementation extracts, either by papergram analysis or by isolation techniques. Steroids of the androstane series were obtained as the reaction products.

Following the procedure of Example 1, 3β-hydroxy-5α-pregnane-11,20-dione 20-ethylene ketal, 16α-methylpregnenolone 20-ethylene ketal, 3β-hydroxy-5α-hydroxy-6β-fluoropregnan-20-one 20-ethylene ketal, 3β-hydroxy-5α-hydroxy-6β-methylpregnan-20-one 20-ethylene ketal, 3β,17α-dihydroxy-5α-pregnane-11,20-dione 20-ethylene ketal, 3β,21-dihydroxy-5α-pregnane-11,20-dione 20-ethylene ketal, and 3β,17α,21-trihydroxy-5α-pregnane-11,20-dione 20-ethylene ketal are converted to 5α-pregn-1-ene-3,11,20-trione 20-ethylene ketal, 16α-methyl-1,4-pregnadiene-3,20-dione 20-ethylene ketal, 5α-hydroxy-6β-fluoro-1-pregnene-3,20-dione 20-ethylene ketal, 5α-hydroxy-6β-methyl-1-pregnene-3,20-dione 20-ethylene ketal, 17α-hydroxy-5α-pregn-1-ene-3,11,20-trione 20-ethylene ketal, 21-hydroxy-5α-pregn-1-ene-3,11,20-trione 20-ethylene ketal, and 17α,21-dihydroxy-5α-pregn-1-ene-3,11,20-trione 20-ethylene ketal, respectively, in higher yield than the corresponding starting compounds without the ketal group are converted to the corresponding products without the ketal group. The ketal groups of the above-described products are hydrolyzed in methanol containing dilute hydrochloric acid to produce the corresponding 20-keto compounds.

EXAMPLE 2A

1-dehydroprogesterone 20-ethylene ketal

Following the procedure of Example 1A, 2.5 g. of pregnenolone 20-ethylene ketal plus 100 mg. of 3-keto-bisnor - 4 - cholen - 22 - aldehyde in 30 ml. of dimethylformamide wis bioconverted with *Septomyxa affinis* (ATCC 6737) in a fermentation medium originally consisting of 1.2% corn steep solids and 1% dextrose. At the end of 24 hours of bioconversion the contents of the fermentor having a pH of 7.65 was extracted 4 times with 10-l. volumes of methylene chloride. The extracted solids were dissolved in 200 ml. of warm methanol, filtered and the thus-produced solution containing 1-dehydroprogesterone 20-ethylene ketal was hydrolyzed without isolation.

25 ml. of 1 N-hydrochloric acid was added to the methanolic solution and heated on a steam bath for 10 minutes and then maintained at room temperature for several days. The solution was concentrated, flooded with water and extracted with methylene chloride. The methylene chloride extracts were washed with aqueous sodium bicarbonate, water, dried and evaporated to give a residue which was chromatographed over magnesium silicate to give 287 mg. of substantially pure 1-dehydroprogesterone, which, when freed of eluting solvent, melted at 149–159° C.

EXAMPLE 2B

Following the procedure of Example 2A exactly, but substituting pregnenolone as the steroid substrate, no 1-dehydroprogesterone could be found in the fermentation extracts, either by papergram analysis or by isolation techniques. Steroids of the androstane series were obtained as reaction products.

EXAMPLE 3A

11α-hydroxyprogesterone 20-ethylene ketal 12 l. of the following medium was prepared, containing per liter of solution: $(NH_4)_2SO_4$, 2 g.; $K_2HPO_4$, 1.0 g.; dextrose (Cerelose), 30 g.; FeSO$_4$, 0.01 g.; MgSO$_4$, 0.5 g.; ZnSO$_4$, 0.3 g.; KCl and tap water 0.5 g. The medium was heat sterilized and then cooled and inoculated with a 24-hour growth of *Sporotrichum epigaeum* (ATCC 7145). After a 48-hour additional growth period with an aeration rate of 1 l. of air per minute (per 12 l. of medium) there was added to the alkaline beer 3 g. of progesterone 20-ethylene ketal [Junkmann, Arch. Exptl. Pathol. Pharmakol., 223:244 (1954)] dissolved in 50 ml. of acetone. Incubation and aeration was continued at room temperature for 48 hours. The alkaline beer was filtered and the mycelium extracted, first with acetone and then with methylene chloride. The filtrate was extracted with methylene chloride. The combined extracts were washed with dilute sodium bicarbonate, water and dried. The solvent was distilled and the residue redissolved in methylene chloride which was then chromatographed on a column of magnesium silicate. The column was developed with hexanes containing increasing proportions of acetone. There was thus eluted 11α-hydroxyprogesterone 20-ethylene ketal as the major bioconversion product.

EXAMPLE 3B

Following the procedure of Example 3A exactly, but substituting progesterone as the starting steroid, 11α-hydroxytestosterone was obtained as the major bioconversion product.

EXAMPLE 4A

*1-dehydroprogesterone 20-ethylene ketal*

A medium of the following composition is prepared: soybean meal, 15.0 g., glucose, 10.0 g.; soybean oil, 2.5 g., and distilled water to make 1 l. Then, 100-ml. portions of the medium are distributed in 500-ml. flasks plugged with cotton and sterilized in the usual manner. When cool, each flask is then inoculated with 5–10% of an alkaline vegetative inoculum of *Streptomyces lavendulae* (WC 3440-14), grown from stock cultures for 48–72 hours in a medium of the following composition: soybean meal, 15.0 g., sodium chloride, 5.0 g.; Cerelose, 21.6 g.; distilled water to make 1 l. The flasks are placed on a reciprocating shaker and mechanically shaken for 48 hours for 2 days. The pH is then adjusted to 7.2 with dilute sodium hydroxide and to each of the flasks is then added 50 mg. of progesterone 20-ethylene ketal dissolved in a minimum amount of dimethylformamide. Shaking is continued for another 2 days.

The alkaline culture is filtered and the mycelium washed first with acetone and then with methylene chloride. The filtrate is extracted with methylene chloride and the combined washings and extracts are washed with dilute aqueous sodium bicarbonate, water and then dried. The dried solution is evaporated, redissolved in methylene chloride and chromatographed on magnesium silicate. The column is developed with hexanes containing increasing amounts of acetone. There is thus eluted as a major bioconversion product 1-dehydroprogresterone 20-ethylene ketal.

EXAMPLE 4B

Following the procedure of Example 4A exactly, but substituting progesterone as the starting steroid, there is thus produced 1-dehydrotestosterone and 1,4-androstadiene-3,17-dione. No bioconversion product of the pregnane series was obtained.

Similar protection of the side chain and 20-keto group is achieved when *Nocardia blackwellii* or *Mycobacterium butyricum* are substituted for the *Streptomyces lavendulae* in Example 4A.

EXAMPLE 5A

*1-dehydroprogesterone 20-ethylene ketal*

A medium of the following composition is prepared: corn steep liquor solids, 3.0 g.; NH$_4$H$_2$PO$_4$, 3.0 g.; CaCO$_3$, 2.5 g.; soybean oil, 2.2 g.; and distilled water to make 1 l. The medium is adjusted to pH 7.0. Then 100-ml. portions of the medium are distributed in 500 ml. Erlenmeyer flasks, and the flasks plugged with cotton and sterilized in the usual manner. When cool, to each of the flasks is added 50 mg. of progesterone 20-ethylene ketal dissolved in a minimum of dimethylformamide. Then each of the flasks is inoculated with 5–10% of an alkaline vegetative inoculum of *Cylindrocarpon radicicola* (ATCC 11011), grown from stock cultures for 48–72 hours in a medium of the following composition: corn steep liquor solids, 15 g.; brown sugar, 10 g.; NaNO$_3$, 6 g.; ZnSO$_4$, 0.001 g.; KH$_2$PO$_4$, 1.5 g.; MgSO$_4$.7H$_2$O, 0.5 g.; CaCO$_3$, 5 g.; lard oil, 2 g.; distilled water to make 1 l., and then adjusted to a pH of 7.2 after growth with sodium hydroxide. The flasks are then placed on a reciprocating shaker (120 1.5-inch cycles per minute) and mechanically shaken at 25° C. for three days. The alkaline contents of the flasks are then pooled and filtered. The mycelium is washed first with acetone and then with methylene chloride and the filtrate extracted with methylene chloride. The combined washings and extracts are washed with dilute aqueous sodium bicarbonate, water and then dried. The solvent is evaporated and the residue redissolved in methylene chloride which is then chromatographed on magnesium silicate. The column is developed with hexanes containing increasing amounts of acetone. There is thus eluted 1-dehydroprogesterone 20-ethylene ketal as a major bioconversion product.

EXAMPLE 5B

Following the procedure of Example 5A exactly, but substituting progesterone as the starting steroid, 1-dehydrotestololactone is obtained as the bioconversion product. No compounds of the pregnane series were obtained.

Similar protection of the side chain is achieved when *Fusarium javanicum* var. *ensiforme* or *Hypomyces haematococcus* is substituted for the *Cylindrocarpon radicicola* in Example 5A.

EXAMPLE 6A

*1-dehydroprogesterone 20-ethylene ketal*

Surface growth from a three-day-old agar slant (beef extract 1.5 g., yeast extract 3 g., peptone 6 g., dextrose 1 g. agar 20 g., distilled water to 1 l.) culture of *Bacterium cyclo-oxydans* (ATCC 12673) is suspended in 5 ml. of sterile physiological saline solution. 1-ml. portions of the suspension are used to inoculate four 50-ml. portions of the following medium contained in 250 ml. conical flasks: glucose, 20 g.; peptone, 5 g.; tryptone, 5 g.; yeast extract, .5 g.; CaCO$_3$, 0.25%; distilled water to make 1 l. The inoculated flasks are incubated at 25° C. with rotary shaking at 280 cycles per minute in a radium of about two inches. After 19 hours a 6% (vol./vol.) transfer is made to 1,950 ml. of the following medium contained in 39 250-ml. conical flasks: yeast extract, 1.0 g.; glucose, 1.0 g.; KH$_2$PO$_4$, 1.0 g.; distilled water to 1 l. with pH adjusted with 10% NaOH to 7 and autoclaved at 120° C. for 20 minutes. Incubation is continued as described above for 24 hours, when an aliquot of a solution of 488 mg. of progesterone 20-ethylene ketal in 19.5 ml. of absolute methanol is added in 0.5-ml. portions to each of the flasks containing the alkaline beer. 24 hours after the steroid is added, the alkaline contents of the flasks are pooled and filtered, the mycelium washed with acetone and then with methylene chloride and the filtrate extracted with methylene chloride. The combined washes and extracts are washed with dilute aqueous sodium bicarbonate, water and then dried. The solvent is evaporated and the residue redissolved in methylene chloride and chromatographed on magnesium silicate. The column is developed with hexanes containing increasing proportions of acetone. There is thus eluted 1-dehydroprogesterone 20-ethylene ketal as the major bioconversion product. No 20β-hydroxy steroid was obtained.

EXAMPLE 6B

Following the procedure of Example 6A exactly, but substituting progesterone as the starting steroid, there is obtained 20β-dihydroxy-1,4-pregnadien-3-one as the major bioconversion product.

Similar protection of the side chain and 20-keto group is achieved when *Arthrobacter simplex*, or *Bacillus sphaericus* is substituted for *Bacterium cyclo-oxydans* in Example 6A.

EXAMPLE 7A

6β-hydroxyprogesterone 20-ethylene ketal

A medium was prepared of 20 g. of Edamine enzymatic digest of lactalbumin, 3 g. of corn steep liquor, and 50 g. of technical dextrose diluted to 1 l. of tap water and adjusted to a pH of 7.0. 12 l. of this sterilized medium was inoculated with *Gliocladium cantenulatum* (ATCC 10523), and incubated for 48 hours at 26° C. using a rate of aeration and stirring such that the oxygen uptake was 6.3 to 7 mM. per hour per liter of $Na_2SO_3$. The pH was adjusted to 7 with sodium hydroxide. To this medium was then added 3.0 g. of progesterone 20-ethylene ketal in 50 ml. of acetone. After an additional 24 hours of incubation under the same conditions, the alkaline beer was filtered. The mycelium was washed twice with acetone and then twice with methylene chloride. The washes were added to the filtrate and the filtrate extracted thoroughly with methylene chloride. The combined washes and extracts were washed with dilute aqueous sodium bicarbonate and then with water, dried and the solvent distilled. The residue was redissolved in methylene chloride and chromatographed on a column of magnesium silicate. There was thus eluted 6β-hydroxyprogesterone 20-ethylene ketal as a major oxygenation product.

EXAMPLE 7B

Following the procedure of Example 7A, but substituting progesterone as the starting steriod, there was produced 4-androstene-3,17-dione and 6β-hydroxy-4-androstene-3,17-dione as the major oxygenation products. No significant amount of pregnane series oxygenation product was obtained.

EXAMPLE 8A

1-dehydroprogesterone 20-ethylene ketal 100 ml. of a 1.0% yeast extract concentrate including 9.0 ml. of 0.2 M. $KH_2PO_4$ and 9.0 ml. of 0.2 M. $NaH_2PO_4$ in a 300 ml. Erlenmeyer flask is sterilized and then inoculated with a 1.0% suspension of *Corynebacterium hoagii* (ATCC 7005) from a 24-hour broth culture. The newly seeded culture is incubated and shaken for 20 hours at 28° C. After incubation, the culture, having a pH of 7, is transferred aseptically to a second sterile 300 ml. Erlenmeyer flask containing 150.0 mg. of progesterone 20-ethylene ketal in a minimal amount of acetone. The resulting mixture is incubated and shaken for 48 hours at 28° C. The resulting culture, having an essentially neutral pH, is extracted thoroughly with methylene chloride which is then washed with water, dried and then poured on a magnesium silicate chromatographic column. The column is developed with hexanes containing increasing amounts of acetone. There is thus eluted 1-dehydroprogesterone 20-ethylene ketal as the only major bioconversion product.

EXAMPLE 8B

Following the procedure of Example 8A, but substituting progesterone as the starting steroid, there is produced a mixture of 1-dehydroprogesterone and bioconversion products resulting from the alteration of the 20-keto function.

Similar results are obtained when *Corynebacterium simplex* (ATCC 6946) is substituted as the oxidizing organism in Example 8.

EXAMPLE 9

1-dehydroprogesterone 20-methyl enol ether

Following the procedure of Example 1A, but substituting pregnenolone 20-methyl enol ether as the starting compound, there is thus produced 1-dehydroprogesterone 20-methyl enol ether.

We claim:

1. In a process for the microbiological oxidation of the nucleus of a 20-keto steroid of the pregnane series with a microorganism which produces reaction by-products resulting from the alteration of the 20-keto function by the microorganism, the improvement which comprises employing as starting steroid a ketonic functional derivative of the 20-keto steroid selected from the group consisting of 20-acetals and 20-enol ethers thereof and conducting the oxidation under substantially nonacidic conditions.

2. The process of claim 1 wherein the ketonic functional derivative is a 20-enol ether of a lower-alkanol.

3. The process of claim 1 wherein the ketonic functional derivative is a 20-enol ether of a lower-alkanol containing from 1 to 2 carbon atoms, inclusive.

4. The process of claim 1 wherein the ketonic functional derivative is a 20-acetal.

5. The process of claim 1 wherein the ketonic functional derivative is a 20-lower-alkylene glycol ketal.

6. The process of claim 1 wherein the ketonic functional derivative is a 20-ketal of a straight chain lower-alkylene glycol.

7. The process of claim 1 wherein the ketonic functional derivative is the 20-ethylene glycol ketal.

8. The process of claim 1 wherein the starting steroid is represented by the formula:

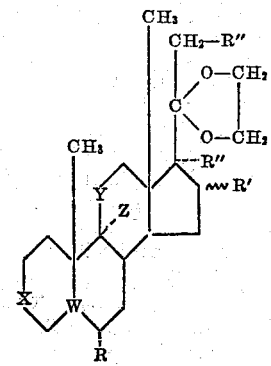

wherein R is selected from the group consisting of hydrogen, fluorine and methyl, R' is selected from the group consisting of hydrogen, hydroxy and methyl, R" is selected from the group consisting of hydrogen and hydroxy, W is selected from the group consisting of single and double bonded $C_5$-carbon atoms, X is selected from the group consisting of hydroxymethylene and carbonyl, Y is selected from the group consisting of methylene, hydroxymethylene and carbonyl, and Z is selected from the group consisting of hydrogen, and, when Y is an oxygen containing function, fluorine and chlorine.

9. In a process for the microbiological introduction of a $\Delta^1$ double bond into the nucleus of a 20-keto steroid of the pregnane series with a microorganism which produces reaction by-products resulting from the alteration of the 20-keto function by the organism, the improvement which comprises employing as starting steroid a ketonic functional derivative of the 20-steroid selected from the group consisting of 20-acetals and 20-enol ethers thereof and conducting the oxidation under substantially non-acidic conditions and separating the thus-produced steroid.

10. The process of claim 9 wherein the microorganism is selected from the group consisting of Corynebacterium, Arthrobacter, Fusarium, Mycobacterium, Cylindrocarpon, and Septomyxa.

11. The process of claim 9 wherein the ketonic functional derivative is a 20-ketal.

12. The process of claim 9 wherein the ketonic functional derivative is a 20-lower-alkylene glycol ketal.

13. The process of claim 9 wherein the ketonic functional derivative is the 20-ethylene glycol ketal.

14. In a process for the microbiological introduction of a $\Delta^1$ double bond into the nucleus of a 20-keto steroid of the pregnane series with a microorganism selected from the group consisting of Corynebacterium, Arthrobacter, Fusarium, Mycobacterium, Cylindrocarpon, and Septomyxa, and which produces reaction by-products resulting from the alteration of the 20-keto function by the organism, the improvement which comprises employing as a starting steroid the 20-ethylene glycol ketal of the 20-keto steroid and conducting the oxidation under substantially nonacidic conditions.

15. The process of claim 14 wherein the microorganism is *Septomyxa affinis*.

16. The process of claim 14 wherein the microorganism is *Corynebacterium hoagii*.

17. The process of claim 14 wherein the starting steroid is the 20-ethylene glycol ketal of a 3-hydroxy-20-keto steroid of the pregnane series.

18. The process of claim 14 wherein the starting steroid is the 20-ethylene glycol ketal of a $\Delta^5$-3-hydroxy-20-keto steroid of the pregnane series.

19. The process of claim 14 wherein the starting steroid is the 20-ethylene glycol ketal of a 3,20-diketo steroid of the pregnane series.

20. The process of claim 14 wherein the starting steroid is the 20-ethylene glycol ketal of a $\Delta^4$-3,20-diketo steroid of the pregnane series.

21. The process of claim 14 wherein the starting steroid is represented by the formula:

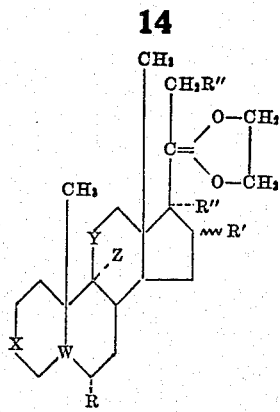

wherein R is selected from the group consisting of hydrogen, fluorine and methyl, R' is selected from the group consisting of hydrogen, hydroxy and methyl, R'' is selected from the group consisting of hydrogen and hydroxy, W is selected from the group consisting of single and double bonded C5-carbon atoms, X is selected from the group consisting of hydroxy-methylene and carbonyl, Y is selected from the group consisting of methylene, hydroxymethylene and carbonyl, and Z is selected from the group consisting of hydrogen, and, when Y is an oxygen containing function, fluorine and chlorine.

22. The process of claim 14 wherein the starting steroid is the 20-ethylene ketal of pregnenolone.

23. The process of claim 14 wherein the starting steroid is the 20-ethylene ketal of 5$\beta$-pregnane-3,11,20-trione.

References Cited in the file of this patent

UNITED STATES PATENTS

| | | |
|---|---|---|
| 2,622,081 | Bernstein et al. | Dec. 16, 1952 |
| 2,864,834 | Mendelsohn et al. | Dec. 16, 1958 |
| 2,866,736 | Camerino et al. | Dec. 30, 1958 |
| 2,866,737 | Shull et al. | Dec. 30, 1958 |
| 2,874,169 | Eppstein et al. | Feb. 17, 1959 |
| 2,883,400 | Eppstein et al. | Apr. 21, 1959 |

FOREIGN PATENTS

| | | |
|---|---|---|
| 759,705 | Great Britain | Oct. 24, 1956 |

OTHER REFERENCES

Bergey's Manual, 7th Edition, 1957, page 1018.

UNITED STATES PATENT OFFICE
CERTIFICATE OF CORRECTION

Patent No. 2,981,659                          April 25, 1961

Gunther S. Fonken et al.

It is hereby certified that error appears in the above numbered patent requiring correction and that the said Letters Patent should read as corrected below.

Column 3, line 6, for "chalcea", in italics, read -- chalae --; in italics; column 6, line 75, for "12.3" read -- 12.3 g. --; column 8, line 62, for "149-159° C." read -- 149-153° C. --.

Signed and sealed this 17th day of April 1962.

(SEAL)
Attest:

ESTON G. JOHNSON                             DAVID L. LADD

Attesting Officer                                 Commissioner of Patents